United States Patent
Houlihan et al.

[15] 3,683,085
[45] Aug. 8, 1972

[54] SECONDARYAMINO PYRIDAZINES

[72] Inventors: William J. Houlihan; Robert E. Manning, both of Mountain Lakes, N.J.

[73] Assignee: Sandoz-Wander, Inc., Hanover, N.J.

[22] Filed: Jan. 14, 1971

[21] Appl. No.: 106,605

Related U.S. Application Data

[63] Continuation-in-part of Ser. No. 860,059, Sept. 22, 1969, Pat. No. 3,579,517, which is a continuation-in-part of Ser. No. 849,151, Aug. 11, 1969, abandoned, which is a continuation-in-part of Ser. No. 671,962, Oct. 2, 1967.

[52] U.S. Cl. .................................................424/250
[51] Int. Cl. ..............................................A61k 27/00
[58] Field of Search......................................424/250

[56] References Cited

OTHER PUBLICATIONS

Chem. Abst., 60, pp. 15871– 15872 (1964).
Chem. Abst., 63, p. 601 (1965).
Chem. Abst., 64, pp. 17594– 17595 (1966).
Chem. Abst., 65, pp. 13673–13674 (1966).

*Primary Examiner*—Stanley J. Friedman
*Attorney*—Gerald D. Sharkin, Frederick H. Weinfeldt, Robert S. Honor, Walter F. Jewell, Richard E. Vila and Thomas O. McGovern

[57] ABSTRACT

Secondaryamino pyridazines and hydrazine substituted secondary-amino pyridazines, e.g., 3,6-dichloro-4-diallylaminopyridazine and 3-chloro-4-dimethylamino-6-hydrazinopyridazine, are prepared from 3,4,6-trihalopyridazines and are useful as central nervous system stimulants, particularly anti-depressants.

13 Claims, No Drawings

SECONDARYAMINO PYRIDAZINES

This application is a continuation-in-part of patent application Ser. No. 860,059, filed Sept. 22, 1969, which has issued as U.S. Pat. No. 3,579,517 on May 18, 1971 which is a continuation-in-part of application Ser. No. 849,151, filed Aug. 11, 1969, now abandoned which in turn is a continuation-in-part of application Ser. No. 671,962, filed Oct. 2, 1967 now abandoned.

This invention pertains to novel heterocyclic compounds and more particularly to novel substituted amino pyridazines. Still more particularly, this invention concerns 3-halo-4-secondaryamino-6-hydrazino pyridazines, intermediates therefor and their methods of preparation.

The compounds of this invention may be represented by the formula

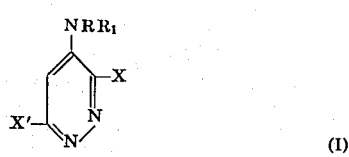

wherein
X represents halo of atomic weight between about 35 to 80;
X' represents halo of atomic weight between about 35 to 80 or hydrazino; and
each R and $R_1$ independently represent lower alkyl, i.e., alkyl having one to four carbon atoms, such as methyl, ethyl, or propyl; phenyl; propargyl; phenyl lower alkyl such as benzyl;

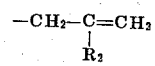

wherein
$R_2$ represents hydrogen or methyl; or
$NRR_1$ together represent 3-azabicyclo[3.2.2]nonyl or a pharmaceutically acceptable acid addition salt thereof, provided that when X' is halo it is the same as X.

The pyridazines of Formula (I) in which X' represents hydrazino are preferred and may be prepared according to the following flow diagram:

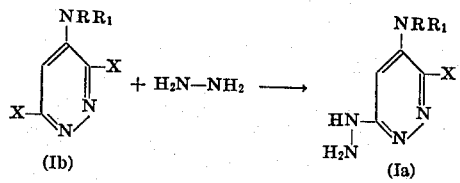

where X, R, and $R_1$ are defined above, and each X is the same.

The compounds of Formula (Ia) are prepared by treating secondary-amino pyridazines (Ib) with hydrazine. The temperature utilized is not critical but the reaction is generally carried out at a temperature of from about room temperature to about 115° C. Desirably, a temperature of about from 60° to 115° C. and preferably about 80° to 115° C. may be used. A solvent is usually employed but is not critical in obtaining the desired product (Ia). Excess hydrazine may be used as the solvent, and inert solvents such as lower alkanols, especially methanol, ethanol, isopropanol and the like, may also be used. The 6-hydrazino-4-secondaryamino-3-halo-pyridazines of Formula (Ia) are recovered by conventional techniques, e.g., fractional crystallization or chromatography.

The process for preparing the compounds of Formula (I) in which X' is halo having an atomic weight between about 35 to 80 is shown in the following reaction scheme:

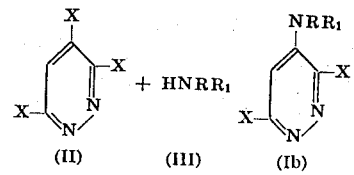

where X, R and $R_1$ are as defined above, and each X is the same.

The compounds of Formula (Ib) are prepared by treating the 3,4,6-trihalopyridazine (II) with a secondaryamine (III). This process can be carried out in an inert solvent, or excess amine (III) may be used. Inert solvents which can be used in preparing the pyridazines of Formula (Ib) include alcohols, especially the lower alkanols, e.g., ethanol, isopropanol, and the like. The particular solvent used is not critical. Generally, a temperature of from about room temperature to reflux temperature may be used and desirably, temperatures of 25° to 175° C. are used. A temperature in the range of 50° to 100° C. is preferred. The 4-substituted amino pyridazines (Ib) may be isolated using conventional techniques, such as extraction, crystallization or chromatography.

The substituted amine reactants utilized in obtaining compounds (Ib) are secondary amines having the general formula

where R and $R_1$ are as described above. Some of the amines which may be used are:
dibenzylamine
dipropargylamine
N-β-methallylbenzylamine
N-propargylbenzylamine
diallylamine
dimethylamine
diphenylamine
3-azabicyclo[3.2.2]nonane
diethylamine
N-methyl aniline
and the like.

The trihalopyridazines of Formula (II) and many of the secondary-amines (III) employed in the above-described process are known and are prepared by methods described in the literature. Those secondary amines not specifically described in the literature may be prepared from available materials by analogous methods.

The pyridazines represented by Formula (I) above are useful because they possess pharmacological properties in animals. In particular, these compounds are central nervous system stimulants and can be used as anti-depressants and psychic-energizers, as indicated by their activity in mice tested according to the 30-word adjective check sheet system basically as described by Irwin, S. Gordon Research Conference, Medicinal Chemistry 1959) and Chen (Symposium on Sedative and Hypnotic Drugs, Williams and Wilkins, 1954).

Furthermore, the compounds of Formula (I) may be similarly employed in the form of their non-toxic pharmaceutically acceptable acid addition salts. Such salts possess the same order of activity as the free base, are readily prepared by reacting the base with an appropriate acid and accordingly, are included within the scope of the invention. Representative of said salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

When so utilized, the compounds or their pharmaceutically acceptable acid addition salts may be administered orally or parenterally as such or admixed with conventional pharmaceutical carriers. They may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90 percent of the active ingredient in combination with the carrier or adjuvant.

The anti-depressive effective amount of active ingredient employed for the treatment of depression may vary depending on the particular compound employed and the severity of the condition being treated. However, in general, satisfactory results are obtained when the compounds are administered at a daily dosage of from about 0.5 milligram to about 100 milligrams per kilogram of animal body weight, preferably given in divided doses two to four times a day, or in sustained release form. For most large mammals in need of said treatment, the total daily dosage is from about 30 to about 600 milligrams. Dosage forms suitable for internal use comprise from about 7.5 to about 300 milligrams of the active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets containing about 25 to 100 milligrams of active ingredient.

EXAMPLE 1

3,6-dichloro-4-dibenzylaminopyridazine

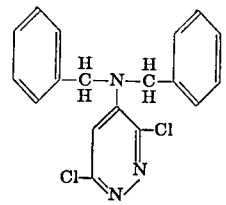

To a flask equipped with a stirrer and condenser is added 10.5 g (0.058 mole) of 3,4,6-trichloropyridazine, 34.4 g (0.175 mole) of dibenzylamine and 200 ml of absolute ethanol. The reaction mixture is refluxed with stirring for 24 hours. The solvent is removed in vacuo and 100 ml of 2N sodium hydroxide is added. The product is extracted with 200 ml of benzene and the benzene layer is washed with 100 ml of water and then 100 ml of saturated sodium chloride solution. The benzene layer is dried with sodium sulfate, filtered and the solvent removed in vacuo. The residue is crystallized from pentane to give 3,6-dichloro-4-dibenzylaminopyridazine; mp 127° to 131° C.

EXAMPLE 2

3,6-dichloro-4-dipropargylaminopyridazine

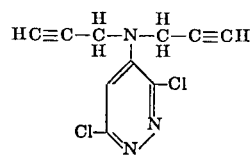

Absolute ethanol (200 ml), 15.3 g of 3,4,6-trichloropyridazine and 23.3 g of dipropargylamine are added to a flask equipped with a stirrer and condenser. The mixture is refluxed with stirring for 26 hours and the solvent is removed in vacuo. 2N sodium hydroxide (125 ml) is then added and the resulting mixture is admixed with 250 ml of benzene. The benzene layer is washed with 125 ml of water and then with 125 ml of saturated sodium chloride solution. The residue is chromatographed through silica gel and the fraction eluted with pentane-benzene (1:1) is crystallized from 50 ml of ether-pentane (1:1) to provide 3,6-dichloro-4-dipropargylamino-pyridazine; mp 99° to 100° C.

EXAMPLE 3

3,6-dichloro-4-(N-β-methallylbenzylamino)pyridazine

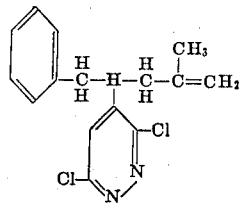

There is admixed 16.7 g (0.091 mole) of 3,4,6-trichloropyridazine, 44.0 g (0.273 mole) of N-β-methallylbenzylamine and 250 ml of absolute ethanol and the mixture is heated to reflux in a flask having a stirrer and condensor. Reflux is continued for 24 hours and the solvent is evaporated in vacuo. 2N sodium hydroxide (150 ml) is added. The mixture is extracted with 300 ml of benzene and the benzene layer is separated and washed with 150 ml of water and 150 ml of saturated sodium chloride solution. The residue is chromatographed through a column of silica gel and the fraction eluted with pentane-chloroform (1:1) is crystallized from 150 ml of ether-pentane (1:1) giving 3,6-dichloro-4-(N-β-methallylbenzylamino)pyridazine; mp 79° to 80° C.

EXAMPLE 4

3,6-dichloro-4-(N-propargyl-N-benzylamino)pyridazine

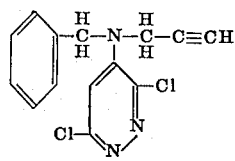

Absolute ethanol (200 ml), 12.6 g (0.07 mole) of 3,4,6-trichloropyridazine, and 29.8 g (0.21 mole) of N-propargylbenzylamine are added to a flask equipped with a stirrer and condenser. The mixture is refluxed with stirring for 26 hours and the solvent is removed in vacuo. Sodium hydroxide (2N, 125 ml) is added to the mixture and benzene is then added (225 ml) to extract the product. The benzene layer is separated and washed with 125 ml of water, 125 ml of saturated sodium chloride solution, and the residue is chromatographed over a silica gel column. The fraction eluted with benzene provides 3,6-dichloro-4-(N-propargyl-N-benzylamino)pyridazine, as a viscous oil.

EXAMPLE 5

3,6-dichloro-4-diallylaminopyridazine

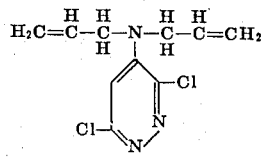

To a flask equipped with a stirrer and condenser is added 600 ml of absolute ethanol, 60 g (0.33 mole) of 3,4,6-trichloropyridazine, and 94 g (0.97 mole) of diallylamine. The mixture is stirred and refluxed for 25 hours and poured into 400 ml of water. Sodium hydroxide (50 percent) is added until the pH is 10.0. The mixture is extracted three times with 300 ml of ethyl ether. The ether layer is then separated, dried with sodium sulfate, filtered and concentrated to about one-third its original volume. The product, 3,6-dichloro-4-diallylaminopyridazine, crystallized and has a melting point of 52° to 54° C.

EXAMPLE 6

3,6-dichloro-4-dipropylaminopyridazine

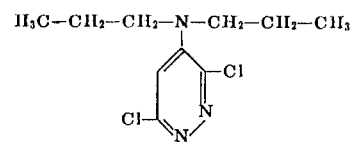

Absolute ethanol (500 ml), 60.7 g (0.60 mole) of dipropylamine, and 36.7 g (0.20 mole) of 3,4,6-trichloropyridazine are added to a flask equipped with a stirrer and condenser. The mixture is refluxed with stirring for 24 hours and the solvent is removed in vacuo. The residue is dissolved in benzene and washed with 2N sodium hydroxide (150 ml), 150 ml of water, and 150 ml of saturated sodium chloride solution. The remaining solution is dried with magnesium sulfate, filtered, and concentrated in vacuo. The residue is distilled to give 3,6-dichloro-4-dipropylaminopyridazine; bp 162° at 0.5 millimeters Hg.

EXAMPLE 7

3,6-dichloro-4-(3-azabicyclo[3.2.2]nonyl)pyridazine

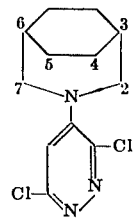

About 750 ml of absolute ethanol, 63 g (0.60 mole) of 3-azabicyclo[3.2.2]nonane, and 36.5 g (0.70 mole) of 3,4,6-trichloropyridazine are stirred and refluxed in a flask for 24 hours. The solvent is removed in vacuo and the residue is dissolved in 250 ml of benzene. The solution is then washed with 100 ml of cold 2N sodium hydrochloride, 100 ml of water, and 100 ml of saturated sodium chloride solution consecutively. The solution is then dried with magnesium sulfate, filtered and the solvent is removed by evaporation. The residue is crystallized from tetrahydrofuran to give 3,6-dichloro-4-(3-azabicyclo[3.2.2]nonyl)pyridazine; mp 108° to 110° C.

EXAMPLE 8

3,6-dichloro-4-(N-methylanilino)pyridazine

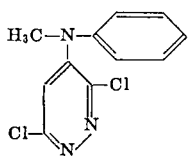

There is admixed in a flask equipped with a stirrer and condenser 5.8 g (0.032 mole) of 3,4,6-trichloropyridazine, 10.1 g (0.095 mole) of N-methylaniline, and 100 ml of absolute ethanol. The mixture is stirred under reflux for 24 hours and the solvent is evaporated in vacuo. The residue is dissolved in 150 ml of benzene and the resulting solution is washed with 50 ml of water and 50 ml of saturated sodium chloride solution. The solution is removed and the residue is chromatographed on silica gel using benzene as the eluant to provide 3,6-dichloro-4-(N-methylanilino)pyridazine; mp 116° to 117° C.

EXAMPLE 9

3-chloro-4-dibenzylamino-6-hydrazinopyridazine

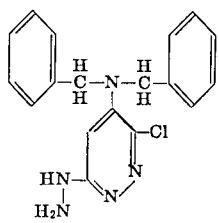

To a flask equipped with a stirrer there is charged 5.0 g of 3,6-dichloro-4-dibenzylaminopyridazine and 25 ml of 97 percent hydrazine. The mixture is stirred with reflux for 4 hours and then poured into 100 ml of water. The water is decanted off and the residue chromatographed through silica gel. The fraction eluted with chloroform is crystallized from tetrahydrofuran/ether (1:1) to give 3-chloro-4-dibenzylamino-6-hydrazino-pyridazine; mp 141° to 143° C.

EXAMPLE 10

3-chloro-4-diallylamino-6-hydrazinopyridazine

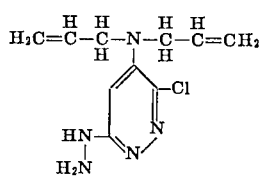

Hydrazine (97 percent, 50 ml) and 10 g of 3,6-dichloro-4-diallylaninopyndazine are added to a flask equipped with a stirrer and condenser. The reaction mixture is heated at reflux temperature for 3 hours, poured into 100 ml of water and the resulting crystallite is filtered off and recrystallized from 75 ml of ethyl ether to provide 3-chloro-4-diallylamino-6-hydrazinopyridazine; mp 95° to 97° C.

EXAMPLE 11

3-chloro-4-(3-azabicyclo[3.2.2]nonyl)-6-hydrazinopyridazine

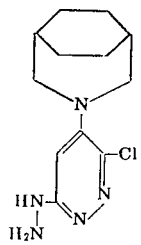

About 40 ml of hydrazine (90%) and 8.0 g of 3,6-dichloro-4-(3-azabicyclo[3.3.3]nonyl)pyridazine are stirred and refluxed for 5 hours and allowed to stand over night at room temperature. The mixture is then poured into 100 ml of water and the solids filtered off. Crystallization from tetrahydrofuran/methanol (1:1) provides 3-chloro-4-(3-azabicyclo[3.2.2.]nonyl)-6-hydrazinopyridazine; mp 204° to 210° C.

EXAMPLE 12

3,6-dichloro-4-dimethylaminopyridazine

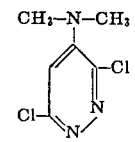

To an ice cooled flask equipped with a stirrer and condenser is added 70.0 g of 3,4,6-trichloropyridazine, 190 ml of 40 percent dimethylamine in water and 300 ml of ethanol. The reaction mixture is stirred for one hour at room temperature. The solvent is partially removed in vacuo and the crystalline product collected to give 3,6-dichloro-4-dimethylaminopyridazine; mp 66° to 68° C.

EXAMPLE 13

3-chloro-4-dimethylamino-6-hydrazinopyridazine

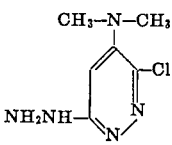

To 50 g of 3,6-dichloro-4-dimethylamino pyridazine is added 540 ml of anhydrous 97 percent hydrazine. The mixture is warmed to 80°C to dissolve the starting material and then stirred for 4 days at room temperature. The precipitate formed in separated by filtration. The precipitate is dissolved in water and extracted with benzene. The benzene is removed from the extractant by evaporation. The residue is 3-chloro-4- dimethylamino-6-hydrazino pyridazine; mp 149° to 150°C.

EXAMPLE 14

Tablets

Tablets suitable for oral administration which contain the following ingredients may be prepared by conventional tabletting techniques. Such tablets are useful in treating depression at a dose of one tablet two to four times a day.

| Ingredient | Weight (mg) |
|---|---|
| 3-chloro-4-diallylamino-6-hydrazinopyridazine | 50 |
| Tragacanth | 10 |
| Lactose | 197.5 |
| Corn Starch | 25 |
| Talcum | 15 |
| Magnesium Stearate | 2.5 |

EXAMPLE 15

Dry Filled Capsules

Capsules suitable for oral administration which contain the following ingredients are prepared in a conventional manner. Such capsules are useful in treating depression at a dose of one capsule two to four times a day.

| Ingredient | Weight (mg) |
|---|---|
| 3-chloro-4-diallylamino-6-hydrazinopyridazine | 50 |
| hydrazinopyridazine | |
| Inert solid diluent (starch, lactose, kaolin) | 250 |

EXAMPLES 16 and 17

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered in the treatment of depression. The injectable suspension is suitable for administration once a day whereas the oral liquid suspension is suitably administered 2 to 4 times per day for this purpose.

| Ingredients | sterile injectable suspension Weight (mg) | oral liquid suspension Weight (mg) |
|---|---|---|
| 3-chloro-4-diallylamino-6-hydrazinopyridazine | 50 (mg) | 50 (mg) |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80) U.S.P. | — | 5 |
| sorbitol solution, 70%, U.S.P. | — | 2,500 |
| buffer agent to adjust pH for desired stability | q.s. | q.s. |
| water | for injection q.s. to 1 ml | q.s to 5 ml |

What is claimed is:

1. A pharmaceutical composition useful in treating depression comprising as an active ingredient thereof a compound of the formula

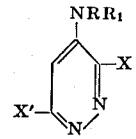

where
X represents halo of atomic weight between about 35 to 80;
X' represents halo of atomic weight between about 35 to 80 or hydrazino;
each R and $R_1$ independently represent lower alkyl, phenyl, propargyl, phenylloweralkyl,

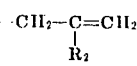

where
$R_2$ represents hydrogen or methyl or
$NRR_1$ together represents 3-azabicyclo[3.2.2]nonyl, or a pharmaceutically acceptable acid addition salt thereof, provided that when X' is halo it is the same as X, and a pharmaceutically acceptable carrier therefor, said compound being present in said composition in an amount sufficient to provide a daily dosage of from about 30 milligrams to about 600 milligrams of said compound.

2. A pharmaceutical composition useful in treating depression comprising as an active ingredient thereof a compound of the formula

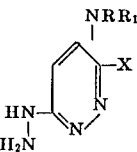

where X, R and $R_1$ are as defined in claim 1, or a pharmaceutically acceptable acid addition salt thereof, and a pharmaceutically acceptable carrier therefor, said compound being present in said composition in an amount sufficient to provide a daily dosage of from about 30 milligrams to about 600 milligrams of said compound.

3. A composition useful in treating depression according to claim 1 in which the active ingredient is 3-chloro-4-diallylamino-6-hydrazinopyridazine.

4. A pharmaceutical composition useful in treating depression comprising as an active ingredient thereof a compound of the formula

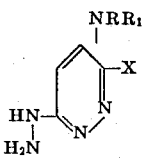

where X, R and $R_1$ are as defined in claim 1, and a pharmaceutically acceptable carrier therefor, said compound being present in said composition to the extent of from about 25 milligrams to about 100 milligrams per unit dosage.

5. A composition useful in treating depression according to claim 4 in which the active ingredient is 3-chloro-4-diallylamino-6-hydrazinopyridazine.

6. A composition useful in treating depression according to claim 1 wherein the carrier is a solid orally ingestible carrier.

7. A tablet useful for treating depression comprising as an active ingredient thereof a compound of the formula

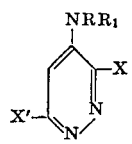

where X, X', R and $R_1$ and the proviso are as set out in claim 1, in combination with pharmaceutically acceptable excipients.

8. A tablet according to claim 7 in which the active ingredient is 3-chloro-4-diallylamino-6-hydrazinopyridazine.

9. A method for treating depression, which comprises orally or parenterally administering to a mammal in need of said treatment an anti-depressive effective amount of a compound of the formula

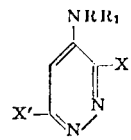

where X, X', R and $R_1$ and the proviso are as set out in claim 1.

10. A method for treating depression which comprises orally or parenterally administering to a mammal in need of said treatment an anti-depressive effective amount of a compound of the formula

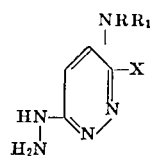

where X, R and $R_1$ are as defined in claim 1.

11. A method according to claim 9 in which the compound is 3-chloro-4-diallylamino-6-hydrazinopyridazine.

12. A method according to claim 9 wherein the compound is administered to a mammal in need of said treatment at a daily dose of from about 30 milligrams to about 600 milligrams.

13. A method according to claim 9 wherein the compound is administered to a mammal in need of said treatment in a unit dosage form comprising said compound to the extent of from about 25 milligrams to about 100 milligrams per unit dosage.

* * * * *